(12) United States Patent
Proennecke

(10) Patent No.: US 7,147,157 B2
(45) Date of Patent: Dec. 12, 2006

(54) SECURE REMOTE-CONTROL UNIT

(75) Inventor: Stéphane Proennecke, Geneva (CH)

(73) Assignee: Compagnie Industrielle et Financiere d'Ingenierie Ingenico, Puteaux (FR)

( * ) Notice: Subject to any disclaimer, the term of this patent is extended or adjusted under 35 U.S.C. 154(b) by 43 days.

(21) Appl. No.: 10/432,440

(22) PCT Filed: Nov. 23, 2001

(86) PCT No.: PCT/IB01/02270

§ 371 (c)(1),
(2), (4) Date: Nov. 4, 2003

(87) PCT Pub. No.: WO02/43015

PCT Pub. Date: May 30, 2002

(65) Prior Publication Data

US 2004/0060977 A1    Apr. 1, 2004

(30) Foreign Application Priority Data

Nov. 24, 2000    (EP)    ................................ 00125778

(51) Int. Cl.
*G06K 7/08*    (2006.01)
(52) U.S. Cl. ..................................................... 235/451
(58) Field of Classification Search ................ 235/451, 235/380, 381, 375, 455, 486; 340/5.71, 5.1, 340/5.23, 928, 933
See application file for complete search history.

(56) References Cited

U.S. PATENT DOCUMENTS

| | | | | |
|---|---|---|---|---|
| 3,371,160 A | * | 2/1968 | Winslow | .................... 348/600 |
| 5,457,811 A | * | 10/1995 | Lemson | .................... 455/67.11 |
| 6,049,289 A | * | 4/2000 | Waggamon et al. | ........ 340/5.23 |
| 6,067,028 A | * | 5/2000 | Takamatsu | .................... 340/5.8 |
| 6,151,652 A | * | 11/2000 | Kondo et al. | ............... 713/300 |
| 6,275,991 B1 | * | 8/2001 | Erlin | .......................... 725/141 |
| 6,339,384 B1 | * | 1/2002 | Valdes-Rodriguez | ........ 340/928 |
| 6,431,439 B1 | * | 8/2002 | Suer et al. | ................... 235/380 |
| 6,557,756 B1 | * | 5/2003 | Smith | .......................... 235/379 |
| 6,570,486 B1 | * | 5/2003 | Simon et al. | ................ 340/5.1 |
| 6,601,762 B1 | * | 8/2003 | Piotrowski | ................... 235/382 |
| 6,667,684 B1 | * | 12/2003 | Waggamon et al. | ........ 340/5.71 |
| 6,807,024 B1 | * | 10/2004 | Yokota et al. | ................ 360/60 |
| 2005/0024185 A1 | * | 2/2005 | Chuey | ........................ 340/5.71 |
| 2005/0024229 A1 | * | 2/2005 | Chuey | ................... 340/825.72 |
| 2005/0026604 A1 | * | 2/2005 | Christenson et al. | ........ 455/419 |

\* cited by examiner

*Primary Examiner*—Thien M. Le
(74) *Attorney, Agent, or Firm*—Rothwell, Figg, Ernst & Manbeck

(57) ABSTRACT

The invention aims at ensuring the security of personal data from a remote server to a final user carrying out purchasing operations, for example. This is achieved by a system comprising a remote-control unit and a multimedia unit provided with means to be connected to a telecommunication network, said multimedia unit comprising a central unit, a non-volatile storage and an input for signals from the remote-control unit. The invention is characterised in that the remote-control unit comprises a unique identification code and means for encrypting data to be transmitted to the multimedia based on said unique code, the multimedia unit comprising means for decrypting the received data.

16 Claims, 2 Drawing Sheets

SECURE REMOTE-CONTROL UNIT

CROSS REFERENCE TO RELATED APPLICATION

This application is a 35 USC § 371 National Phase Entry Application from PCT/IB01/02270, filed Nov. 23, 2001, and designating the U.S.

BACKGROUND OF THE INVENTION

The present invention relates to a remote control unit for a pay television multimedia unit, in particular for financial applications.

The unique function of the television set is already part of the past and suppliers of services have well understood the opportunity that this window on the world presents for offering services other than the simple consumption of public television channels.

The first service to have been offered to users was pay television. This application requires the use of a special unit for decrypting encrypted television signals. Development has been rapid since the first analogue decoders and the multimedia units of today are in every way as sophisticated as personal computers.

The designers of these multimedia units quickly understood the opportunities presented by such devices in the homes of thousands, and even millions, of clients, all of whom are potential purchasers. The arrival of the internet, with its range of services, convinced operators that the multimedia unit would also make it possible to navigate the world wide web.

The preferred user interface for the multimedia unit is of course the remote control unit. It is used for entering navigation instructions and for placing orders.

SUMMARY OF THE INVENTION

A new application has arisen with the possibility of carrying out purchasing operations over the internet. Multimedia units have means for encrypting confidential data for sending to teleshopping servers.

The most widespread method for carrying out purchasing operations is the credit card. As the number of the card is confidential, the data relating to this type of payment is encrypted in order to guarantee the confidentiality of the card's data according to the SET or SSL protocol.

The new generation of multimedia unit therefore integrates a smart card reader making it possible to identify the holder of the said card and to carry out the necessary cryptographic operations. According to the method used in this type of payment, the user must enter his secret code (PIN) prior to the use of the data contained in his card.

This entry is carried out via the remote control unit, whether this be a simple remote control unit having only numerical buttons, or a more sophisticated remote control unit having an alphanumeric keyboard and a display.

The link between the remote control unit and the multimedia unit is generally of the infrared type and is characterized by widespread spatial broadcasting. It is thus possible to control its multimedia unit even if the latter is not in the axis of the remote control unit.

An important aspect of this invention is the acknowledgement of this weak point, that is to say that the user will use a means having significant radiation for transferring his personal and secret code from the remote control unit to the multimedia unit.

It is known to integrate in a remote control unit means for emulating a payment terminal. Such a terminal is described in the document U.S. Pat. No. 5,973,756 wherein a magnetic card reader makes it possible to carry out banking transactions. This terminal is called "anonymous" because is does not contain any element of security. It receives the PEK session key from the unit connected to the network in order to encrypt the magnetic card data and the PIN code.

This system does not make it possible to provide security independent of the application being used (the encryption key complying with the payment standards) and the terminal does not have any key of its own.

The purpose of the present invention is to be able to guarantee the security of personal data from the remote server up to the final user carrying out purchasing operations and to make it possible to identify the terminal in a unique manner.

This objective is achieved for a system comprising a remote control unit and a multimedia unit having means of being connected to a telecommunications network, this multimedia unit comprising a central unit, a non-volatile memory and an input for signals from the remote control unit, characterized in that the remote control unit comprises a unique identification code and means for encrypting the data to be transmitted to the multimedia unit based on this unique code, the multimedia unit comprising means for decrypting the received data.

Because of this system, the signals transmitted between the multimedia unit and the remote control unit are secure and cannot be interpreted by a third party and the remote control unit is identified in a unique manner by its identification code.

Multimedia units are devices that do not have a protected area and are therefore not capable of retaining secret information such as, for example, a private asymmetric key. In fact, it should not be possible for an in-depth analysis of such a multimedia unit to give a third party the possibility of deciphering the information transmitted in secure form. In order to prevent this, it is necessary for the encryption key to be unique to the multimedia unit/remote control unit pair.

According to the invention, the remote control unit can be of two types, either unidirectional or bidirectional.

In the first case, the secure transmission mode is activated by the user by a specific command on the remote control unit. The remote control unit generates a random number and reads its serial number in order to form an asymmetrical encryption code CS. These items of information are encoded via a private asymmetric encoding key (of the RSA type for example), referred to as a transaction key CT. A transaction signature is thus constructed. The module of the transaction key has been encoded with a private asymmetric key, referred to as the construction key CC, and this private construction signature is entered into the permanent and protected memory of the remote control unit in the factory. The multimedia unit on the other hand is in possession of the public construction key in order to be able to decrypt the data sent by the remote control unit and to detect the symmetrical encryption key CS. This key will be used to encrypt the data transmitted by the remote control unit.

Encryption algorithms can be asymmetric, such as described above, or symmetric. It is also possible to use keys or elliptic functions.

When the secure mode is initialised, the transaction and constructions signatures are sent to the multimedia unit. This packet is preceded by a secure mode indicator to inform the multimedia unit that the processing will be special.

On reception, the multimedia unit deciphers the public transaction key from the signature of the construction key. The multimedia unit decodes the random number and the identification code (for example the serial number) of the remote control unit from the transaction signature. It then derives the symmetric session key (of the DES type for example) from the identification code and the random number.

The acquisition of the user's secret code can then start. If the display is produced on the television set, the following sequence is carried out, on the basis of symmetric encryption DES:

the first symmetric key is used for encrypting the first button pressed on the remote control unit, a new symmetric key is recalculated from the old symmetric key and from the pressed button, this process is repeated until the end of the entry of the secret code.

According to a variant, the remote control unit has a display and once the secret code has been acquired, it is sent to the multimedia unit in the form encrypted by means of the symmetric key DES.

In this second case, that is to say with a bidirectional link between the remote control unit and the multimedia unit, a dialogue can be started between these two entities.

The multimedia unit sends the remote control unit a message comprising the public asymmetric encoding key. The remote control unit initialises its secure operating mode and generates a symmetric session key. The remote control unit proceeds with the acquisition of the user's secret code, this acquisition being validated by the user. If the display is produced on the remote control unit, the number of characters acquired will, for example, be displayed.

The remote control unit encrypts the secret code and sends a packet that it inserts in an OAEP block according to the SET standards.

The remote control unit encodes the OAEP block with the public asymmetric key that it received from the multimedia unit and it returns this encrypted information to the multimedia unit.

Once the code has been transmitted, the remote control unit returns to normal mode.

Various encryption algorithms can be used such as the Simple-DES type for constructing the session code and the PIN block, the SHA-1 type for constructing the OAEP block or the RSA type for encrypting the OAEP block with the public key provided by the multimedia unit.

BRIEF DESCRIPTION OF THE DRAWINGS

The invention will be better understood from the following detailed description given with reference to the attached drawings in which.

DETAILED DESCRIPTION

Figure 1:
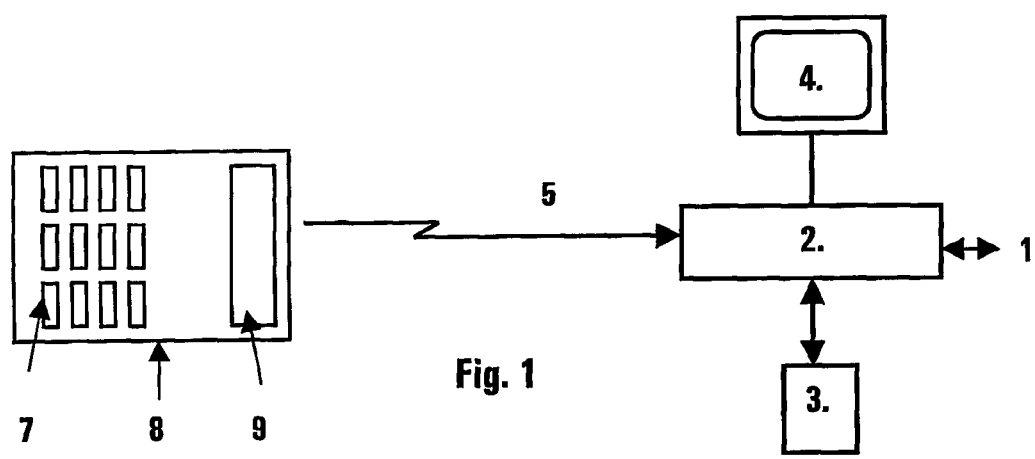
FIG. 1 shows the configuration of the system of the invention in unidirectional mode.

FIG. 1 shows the remote control unit and multimedia unit assembly. The multimedia unit comprises a central part 2 connected to the external world by an input/output 1. A display screen 4 and the user's payment card 3 are connected to this multimedia unit.

The remote control unit 8 has a keypad 7 and a display 9. The data is transmitted by infrared means, which is the most common way for this type of remote control unit.

The payment card 3 is introduced into the multimedia unit 2 by insertion into a housing provided for this purpose. The multimedia unit can thus read the card 3 for user identification requirements.

The remote control unit 8 makes it possible to enter the secret code number and, depending on the variants, to display it on the display 9. In fact, it is normal for the secret code not to be displayed clearly but for return information to appear on the display in the form of a star. However, when this type of use takes place in a protected environment, it is possible to dispense with this principle and to indicate to the user which button he has pressed.

Figure 2:
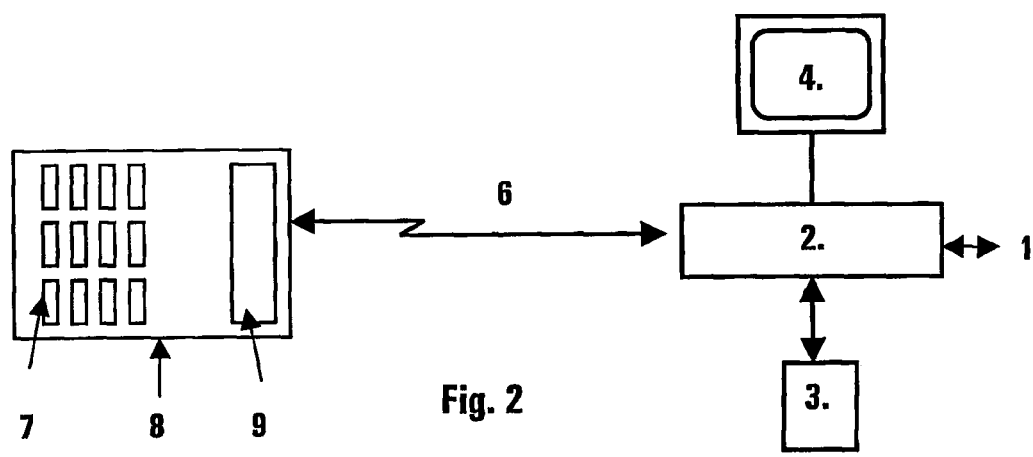
FIG. 2 shows the configuration of the system of the invention in bidirectional mode.

In FIG. 2, the remote control unit has a bidirectional link allowing the establishment of a dialogue for defining the keys. This mode is that of the future not only in this type of use but also for interactive games. The use of this mode makes it possible for the multimedia unit to generate a new RSA key each time the secret code is entered. There is therefore no risk of compromising the security of remote control units globally since, even if a key should become known, it would provide access to only one specific secret code.

Figure 3:
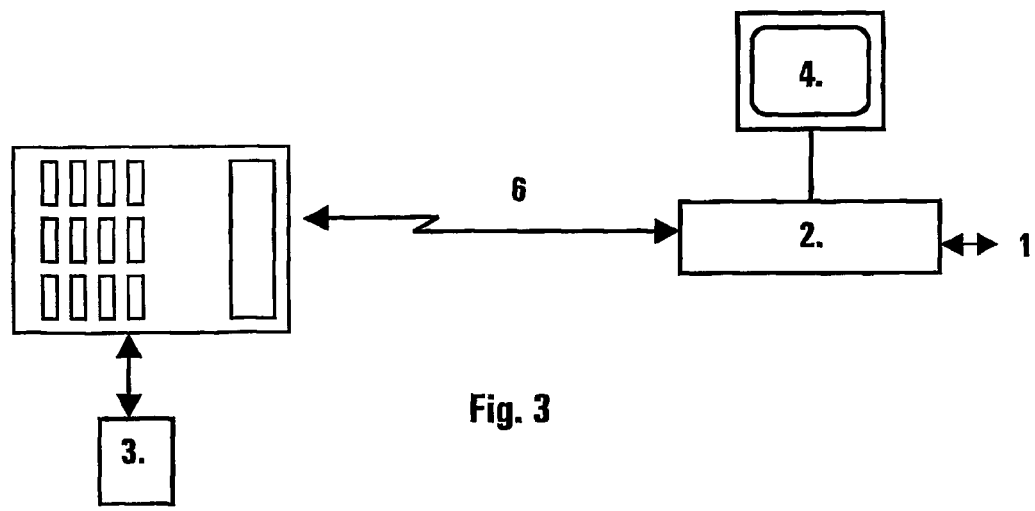
FIG. 3 shows the configuration of the system of the invention in the bidirectional mode with a card reader in the remote control unit.

According to the variant shown in FIG. 3, the remote control unit is converted into a genuine transaction terminal. The whole of the security section is integrated in this remote control unit and the dialogue between the remote control unit and the multimedia unit is encrypted according to the procedures described above. The data exchanged by infrared means is secure.

The field of application of such a remote control unit is not limited to pay television. It can be used for an on-line lottery by the secure downloading of valid numbers into a user's remote control unit. In the same way, the numbers entered by the user are signed by the private key contained in the remote control unit and identify the user in a definite manner.

This remote control unit is also used for entering passwords for the various pay services offered to users.

The making of data, such as described above, secure for an infrared remote control unit can be extended to other types of media such as:

data transmitted by infrared means between a mobile telephone and a computer, peripherals using electromagnetic waves for transmitting data to computers based on standards such as Blue Tooth.

The method of producing the transaction and construction keys fulfils the security requirements in a unidirectional transaction. However, simplified methods of generation can also be used.

It is thus possible to request the user to program a key in the remote control unit and in his multimedia unit. If both of these keys are identical, the system will operate satisfactorily. If this is not the case, the multimedia unit will inform the user of the impossibility of decrypting the message sent by the remote control unit.

In order not to impose a double entry, the remote control unit, in one mode of initialisation, transmits the encryption key to the multimedia unit. According to one embodiment, the infrared transmission level is attenuated so that this key cannot be intercepted by a third party.

Another variant of generation of keys consists in generating a symmetric key CS in the remote control unit and encrypting it by the private construction key CC: it is then decrypted by the multimedia unit using its public key and used for the subsequent transmissions.

This symmetric key CS can be replaced by a new symmetric key CS' based on a random number generated by the remote control unit and transmitted to the multimedia unit in a form encrypted by the key CS.

Instead and in place of generating a symmetric key CS, it is possible to replace the private symmetric key by a private asymmetric key CT. The transmission then advantageously takes place in attenuated spatial broadcasting mode. Once the signature containing the key CT is decrypted by the public key CC of the multimedia unit, it is this public key CT that will make it possible to decrypt the data transmitted from the remote control unit.

According to another embodiment of the initialisation, the remote control unit comprises a public key and a private key unique to the remote control unit. At the time of the first initialisation, the public key is transferred from the remote control unit to the multimedia unit. The private key is retained in the cryptographic processor of the remote control unit.

In a secure transaction operating mode, the use of the unique identification code of the remote control unit makes it possible to generate a unique session key applicable to that remote control unit. The multimedia unit is then associated (pairing) with that remote control unit and the encryption protocol is defined according to specifications that are independent of a payment standard. In fact, the solutions of the present state of the art propose the emulation of a payment terminal by a portable module connected by an infrared link. The encryption protocol is thereafter fixed by the payment protocol and is therefore known per se. It is possible to be in a situation in which security different from that defined by this protocol is desired.

Figure 4:
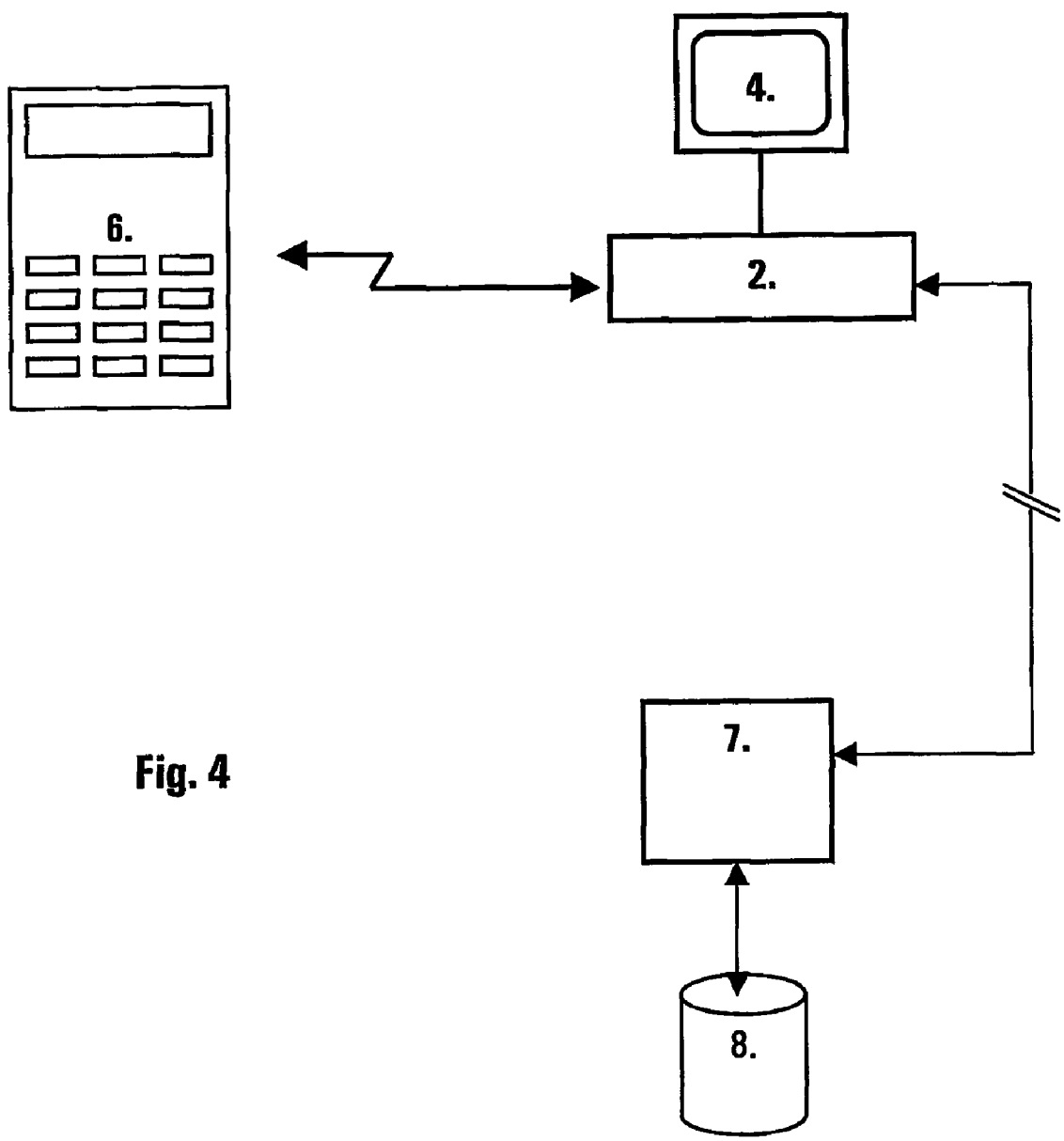
FIG. 4 shows a configuration in which the multimedia unit is connected to a processing centre.

FIG. 4 shows the diagram of a transaction with a processing centre. This centre 6 is responsible for verifying the identity of the user of the terminal 6. In the case of a payment transaction, the prior condition is recognition of the user, or at least of his payment terminal. That is why the identification code of the terminal 6 is stored in the database of the management centre 7. The terminal 6 can thereafter initiate a secure transaction and be recognised in an undeniable manner by the management centre. According to another operating mode, the security layer defined between the remote control unit and the multimedia unit is added to the security layer defined between a management centre and a payment terminal. The encryption procedures according to the payment protocol are executed by the remote control unit, this data then being encrypted according to the protocol defined between the terminal and the multimedia unit. This method makes it possible to guarantee constant security between the remote control unit and the multimedia unit.

The invention claimed is:

1. System comprising:
a remote control unit having a unique identification code, a random number and means for encrypting data based on the unique identification code and the random number; and
a multimedia unit having means for connecting to a telecommunications network, a central unit, a non-volatile memory, an input for signals from the remote control unit, and means for decrypting data received from the remote control unit based on the unique identification code and the random number.

2. System according to claim 1, characterized in that the link between the remote control unit and the multimedia unit is of infrared type.

3. System according to claim 1, wherein the means of encryption are based on a private key and the means of decryption are based on a public key.

4. System according to claim 1, characterized in that the remote control unit comprises a transmission intensity attenuator activated during the transmission of a public key to the multimedia unit.

5. System according to claim 1, characterized in that the remote control unit comprises a random number generator and at least one unique number.

6. System according to claim 1, characterized in that the remote control unit comprises a bidirectional link interface with the multimedia unit.

7. System according to the preceding claim, characterized in that the remote control unit comprises a smart card reader.

8. Secure transmission method between a remote control unit having a unique identification code and a random number, and a multimedia unit connected to a telecommunications network, the method comprising:
encrypting data sent by the remote control unit to the multimedia unit via a transport key generated on the basis of the unique identification code and the random number, and
the data received by the multimedia unit via a corresponding transport key.

9. Method according to claim 8, wherein the transport key is asymmetric and includes a private key and a public key, the private key being used in the remote control unit and the public key being used in the multimedia unit.

10. Method according to claim 9, wherein the remote control unit initially contains the private key and the public key, the method further comprising sending the public key to the multimedia unit in an initialization phase.

11. Method according to claim 8, further comprising:
generating, by the remote control unit, the random number and reading the unique identification code to form a symmetric encryption transport key CS,
encrypting these items of information via a first private asymmetric encoding key CT and composing a transaction signature,
transmitting the transaction signature with a construction signature contained in the memory of the remote control unit and comprising the first public key CT encrypted by a second private key CC loaded during the initialization of the remote control unit,
decrypting the construction signature in the multimedia unit, by means of the second public key CC, and extracting the first public key CT therefrom,
decrypting the transaction signature via the first public key CT in order to obtain the symmetric encryption transport key CS,
decrypting the data transmitted from the remote control unit by means of the symmetric encryption transport key CS.

12. Method according to claim 11, wherein a processing center is connected to the telecommunications network, the method further comprising:
receiving, by the multimedia unit, the data encrypted according to a processing center protocol,
encrypting the data by means of the symmetric encryption transport key CS,
transmitting the data to the remote control unit,
decrypting the data by the remote control unit by means of the symmetric encryption transport key CS, processing return data and encrypting the return data according to the processing center protocol, encrypting the return data by means of the symmetric encryption transport key CS, transmitting the return data to the multimedia unit, decrypting the return data by means of the symmetric encryption transport key CS, and transmitting the return data to the processing center.

13. System comprising:

a remote control unit; and a multimedia unit, wherein the remote control unit includes a unique identification code, a transmission intensity attenuator activated during transmission of a public key to the multimedia unit, and means for encrypting data to be transmitted to the multimedia unit based on the unique identification code, and the multimedia unit includes means for connecting to a telecommunications network, a central unit, a non-volatile memory, an input for signals from the remote control unit, and means for decrypting the data received from the remote control.

14. Secure transmission method between a remote control unit having a unique identification code and a multimedia unit connected to a telecommunications network, the method comprising:

generating, by the remote control unit, a random number and reading the unique identification code in order to form a symmetric encryption key CS, encrypting the unique identification code and the random number using a first private asymmetric encoding key CT and composing a transaction signature, transmitting the transaction signature with a construction signature contained in the memory of the remote control unit, the construction signature including the first public key CT encrypted by a second private key CC loaded during the initialization of the remote control unit, decrypting the construction signature in the multimedia unit, by means of the second public key CC, and extracting the first public key CT from the construction signature, decrypting the transaction signature using the first public key CT to obtain the symmetric encryption key CS, encrypting and decrypting data transmitted between the remote control unit and the multimedia unit by means of the symmetric encryption key CS.

15. Method according to claim 14, wherein a processing center is connected to the telecommunications network, the method further comprising:

receiving, by the multimedia unit, data encrypted according to a processing center protocol, encrypting the data by means of the symmetric encryption key CS, transmitting the data to the remote control unit, decrypting the data by means of the symmetric encryption key CS, encrypting return data according to the processing center protocol, encrypting the return data by means of the symmetric encryption key CS, transmitting the return data to the multimedia unit, decrypting the return data by means of the symmetric encryption key CS, and transmitting the return data to the processing center.

16. System according to claim 6, wherein:

the remote control unit includes means for decrypting data based on the unique identification number and the random number; and the multimedia unit includes means for encrypting data based on the unique identification number and the random number.

* * * * *